(12) United States Patent
Chiodo

(10) Patent No.: US 7,534,067 B2
(45) Date of Patent: May 19, 2009

(54) COUPLING ASSEMBLY FOR ANIMAL MANAGEMENT SYSTEMS

(76) Inventor: Chris D. Chiodo, 29277 Newport, Warren, MI (US) 48093

(*) Notice: Subject to any disclaimer, the term of this patent is extended or adjusted under 35 U.S.C. 154(b) by 435 days.

(21) Appl. No.: 11/346,851

(22) Filed: Feb. 3, 2006

(65) Prior Publication Data

US 2007/0244422 A1 Oct. 18, 2007

(51) Int. Cl.
*F16D 1/00* (2006.01)
(52) U.S. Cl. ............... 403/350; 600/415; 324/321
(58) Field of Classification Search ............ 403/322.2, 403/351, 352, 367, 371, 374.1, 374.2; 285/314, 285/315, 276
See application file for complete search history.

(56) References Cited

U.S. PATENT DOCUMENTS

| | | | | | |
|---|---|---|---|---|---|
| 1,341,934 | A | * | 6/1920 | Schoenborn | 279/81 |
| 1,543,356 | A | * | 6/1925 | Harkwood | 285/314 |
| 1,879,364 | A | * | 9/1932 | Lomar | 285/314 |
| 2,006,833 | A | * | 7/1935 | Jensen | 285/277 |
| 2,365,327 | A | * | 12/1944 | Barnes | 166/196 |
| 2,470,256 | A | * | 5/1949 | McIlroy | 285/277 |
| 3,083,042 | A | * | 3/1963 | Collar | 285/93 |
| 3,356,985 | A | * | 12/1967 | Strehle et al. | 439/348 |
| 3,822,951 | A | * | 7/1974 | Bornzin | 403/316 |
| 4,775,269 | A | * | 10/1988 | Brix | 408/239 R |
| 4,859,110 | A | * | 8/1989 | Dommel | 403/325 |
| 5,601,380 | A | * | 2/1997 | Guthrie et al. | 403/359.3 |
| 5,707,340 | A | * | 1/1998 | Hipp et al. | 600/112 |
| 6,568,717 | B1 | * | 5/2003 | Le Clinche | 285/315 |
| 7,040,023 | B2 | * | 5/2006 | Nemazi et al. | 30/392 |
| 7,107,690 | B2 | * | 9/2006 | Lui et al. | 30/392 |
| 7,414,403 | B2 | | 8/2008 | Chiodo | |

* cited by examiner

*Primary Examiner*—Daniel P Stodola
*Assistant Examiner*—Joshua T Kennedy
(74) *Attorney, Agent, or Firm*—Lawrence J. Shurupoff

(57) ABSTRACT

A releasable coupling includes a male coupling portion having a frustoconical male plug portion, and a female coupling portion having a frustoconical female socket portion. The male and female coupling portions are locked together and unlocked by a bidirectional rotatable cam ring which drives one or more balls between the male and female coupling portions.

17 Claims, 7 Drawing Sheets

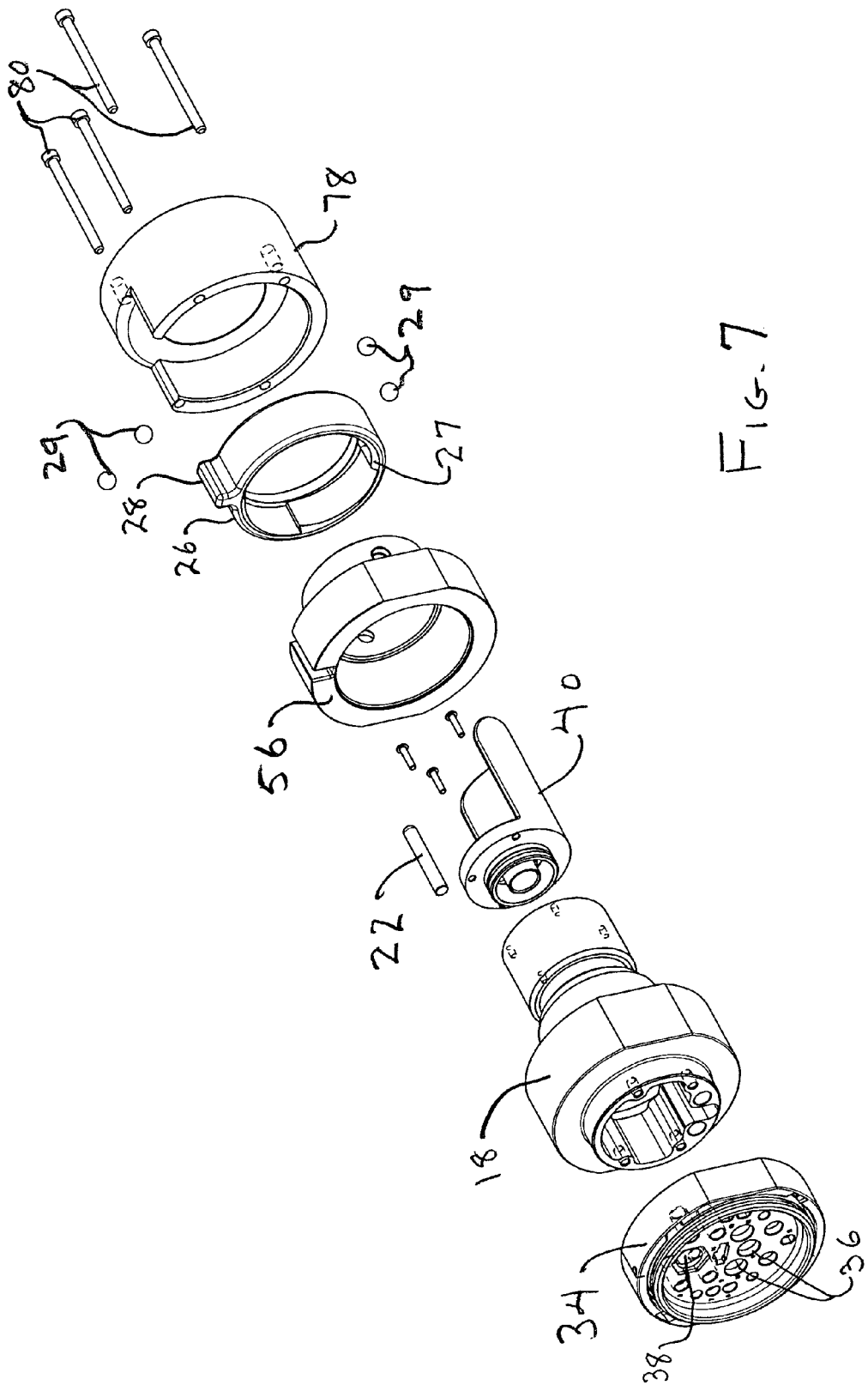

COUPLING ASSEMBLY FOR ANIMAL MANAGEMENT SYSTEMS

GOVERNMENT RIGHTS

This invention was made with government support under contracts 1 R41 NS050141-01 and 3 R41 NS050141-0151 awarded by The National Institutes of Health (NIH). The government has certain rights in the invention.

BACKGROUND OF THE INVENTION

1. Field of the Invention

The present invention relates in general to couplings having male and female portions for interconnecting subassemblies, and relates in particular to a precision coupling for axially and radially securing a specimen holder to a positioning assembly for mounting a specimen, such as a laboratory rodent, in an imaging machine such as an X-ray, CAT, MRI or PET machine.

2. Description of Prior Developments

Medical researchers and doctors need to study various anatomical features using different types of imaging devices such as X-ray machines, computerized axial tomography (CAT or CT) scanning machines, MRI machines and photon emission tomography (PET) machines. In order to produce images with the most detail and clarity, individual images from the various types of imaging devices are combined using sophisticated software to produce composite images.

In order to produce optimum composite images, the specimen being imaged must be accurately located within the field of view of each machine. This requires that the specimen be imaged in one machine, removed from that machine and properly located and set up in one or more additional imaging machines for additional imagining. This process can be time consuming and labor intensive.

What is needed is a method and apparatus for quickly, easily, accurately and repeatably positioning a specimen within the field of view of the same imaging machine and/or a series of different imaging machines over a period of time. A particular need exists for a convenient way to connect and disconnect a specimen holder to and from a modular receiver or positioning receiver system on one imaging machine and then connect and disconnect the same specimen holder to and from a different imaging machine without any complicated set up procedures.

SUMMARY OF THE INVENTION

The present invention has been developed to provide an interconnection between a spacing and positioning system adapted to be connected to an imaging machine and a specimen holder which is adapted to hold and accurately position a specimen for repeatable placement in the same or different imaging machines.

The coupling includes male and female frustoconical plug and socket members. The frustoconical interconnection, coupling and resulting alignment provide both radial centering and positioning as well as axial registration and positioning along precision machined frustoconical surfaces. The male and female members or portions are axially and radially cammed into position by a rotatable cam ring acting on a circumferentially-spaced series of balls, such as ball bearings.

The cam ring can be manually-actuated or driven by an external power source. A manually-actuated screw or cam can also be used for such centering as well as an axially-actuated air cylinder and plunger. In any case, an axial and radial force is applied to the interface between the conical surfaces of the plug and socket members to register a positioning receiver system with the animal holder for accurate, repeatable positioning of a specimen within the field of view of an imaging machine. Nominally, a male cone portion is provided on an animal holder system, and a female cone portion is provided on the spacer assembly or positioning receiver system, however, this can be switched around if desired.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the Drawings:

FIG. 7 is a perspective exploded view of the entire coupling assembly.

DETAILED DESCRIPTION OF THE PREFERRED EMBODIMENTS

Figure 1:
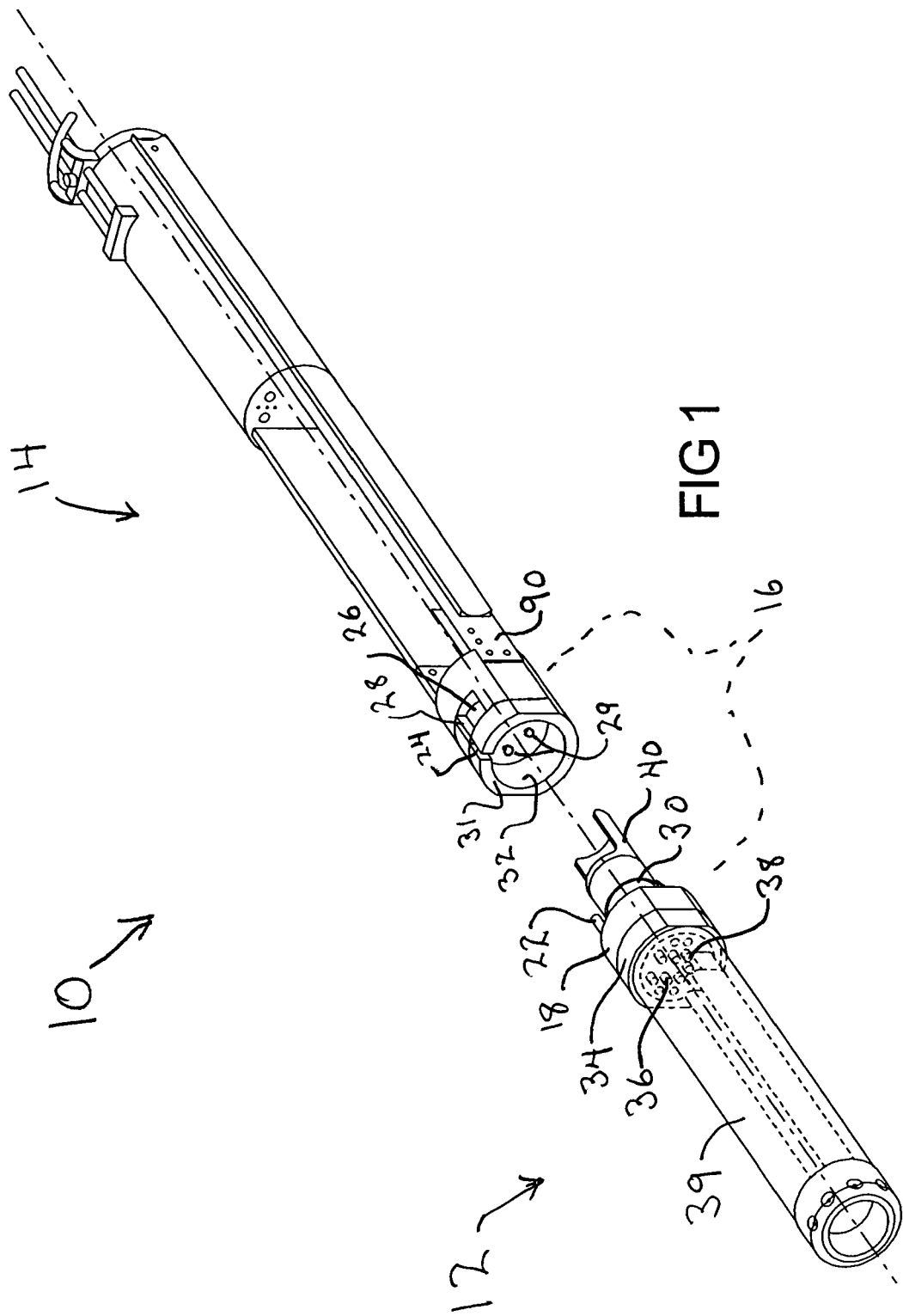
FIG. 1 is a perspective view of an animal management system provided with a coupling assembly constructed in accordance with the present invention and shown in a decoupled or separated position.

The present invention will now be described in conjunction with the drawings, beginning with FIG. 1 which shows an animal management system or specimen positioning system 10 including a coupling assembly constructed in accordance with a first embodiment of the invention. The positioning system 10 is adapted for use in an MRI positioning assembly such as disclosed in US patent application publication number US 2005/0027190A1, filed Aug. 10, 2001, under application Ser. No. 10/631,226, and which is incorporated herein by reference in its entirety.

While the specimen positioning assembly in U.S. 2005/0027190, now U.S. Pat. No. 7,414,403, provides for a unitary specimen positioning assembly, the present invention provides for an equivalent modular, easily decoupled multicomponent positioning system. That is, the positioning system 10 of the present invention includes a detachable modular specimen holder or animal holding system 12 which is quickly and easily removably and selectively mountable on a positioning receiver assembly 14. In U.S. 2005/0027190, now U.S. Pat. No. 7,414,403, the animal holding system and positioning receiver assembly are not readily detachable.

A modular coupling 16, which embodies the present invention, is provided between the animal holding system 12 and the positioning receiver assembly 14 for accurately and repeatably coupling the animal holding system 12 to the positioning receiver assembly 14 to form system 10, such as disclosed in U.S. patent application Ser. No.11/346,850, filed Feb. 3, 2006, titled "SPECIMEN POSITION SYSTEM FOR IMAGING MACHINES". Coupling 16 includes a male coupling portion 18 mounted on an outer end of the animal holding system 12 and a female coupling portion 20 mounted on an inner end of the positioning receiver assembly 14. If desired, the male and female portions 18, 20 of coupling 16 can be reversed, as long as all other compatible systems 10 are similarly adapted.

Figure 2:
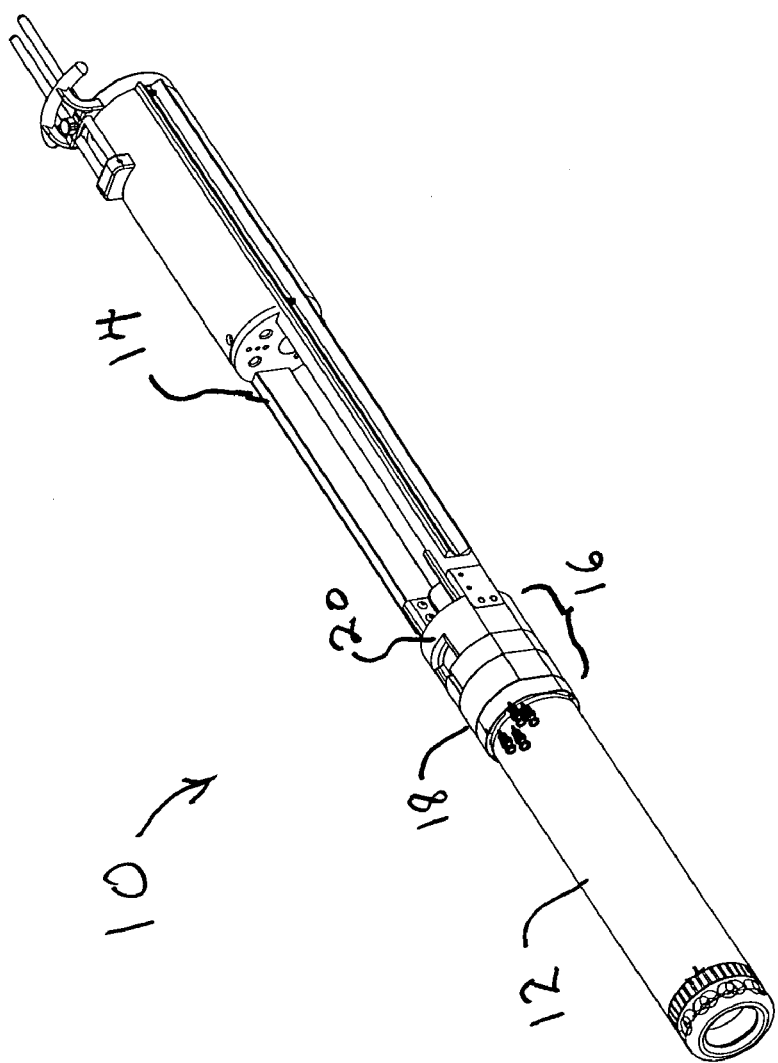
FIG. 2 is a perspective view of FIG. 1 shown in a coupled position.

As can be appreciated from FIGS. 1 and 2, once the male coupling portion 18 is inserted within the female coupling portion 20, a male keying member 22 projecting from a predetermined circumferential or clockwise position (such as 12 o'clock) on the male coupling portion 18 is inserted and guided into a complementary axially-extending keying slot 24 formed in a predetermined circumferential or clockwise position (such as 12 o'clock) in the female coupling portion 20. This keying feature circumferentially aligns the animal holding system 12 with the positioning receiver assembly 14. This clockwise alignment ensures proper, accurate and repeatable placement of a specimen held within the animal holding system 12 within a known axial plane within the field of view of an imaging machine.

Figure 3:
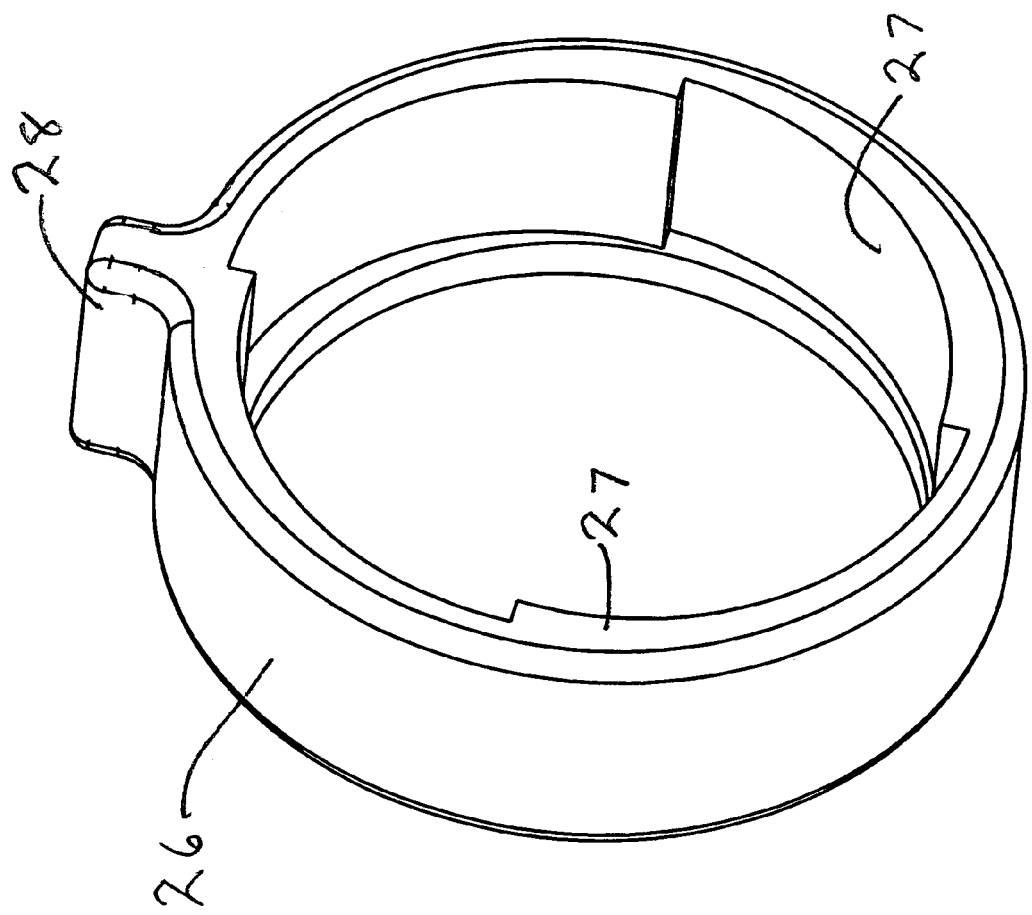
FIG. 3 is an enlarged perspective view of the cam ring shown in FIG. 1.

As discussed in more detail below, once the male coupling portion 18 is almost fully inserted within the female coupling portion 20, a cam ring or cam driver 26 with circumferentially-extending cam ramps 27 (FIG. 3) mounted within the female coupling portion 20, can be rotated by a cam lever or cam finger grip tab 28. The cam ring acts as a cam driver to radially compress a circumferentially-spaced series of cams such as balls 29 loosely held within the female coupling portion 20. This camming action on cam balls 29 axially wedges and locks a radially stepped registration surface 25 (FIG. 4) on the male coupling portion 18 into a tight axial abutment against a front radial registration surface 31 on the front face of the female coupling portion 20. At the same time, a frustoconical male plug portion 30 on the male coupling member 18 is pulled into and tightly seated and centered within a complimentary frustoconical female socket portion 32 formed within the female coupling portion 20.

This conical nesting accurately and securely coaxially centers the male coupling portion 18 within the female coupling portion 20 and thereby coaxially aligns the animal holding system 12 with the positioning receiver assembly 14. At the same time, the tight axial abutment between the male and female coupling portions 18, 20 along registration surfaces 25, 31 accurately axially locates and registers the animal holding system 12 with respect to the positioning receiver assembly 14.

In order to release and separate the male coupling portion 18 from the female coupling portion 20, an operator need only rotate or push the cam tab 28 in an opposite direction to that of the locking direction. The animal holding system 12 can then be easily removed and placed in another positioning receiver assembly 14 in a different type of imaging machine.

Figure 6:
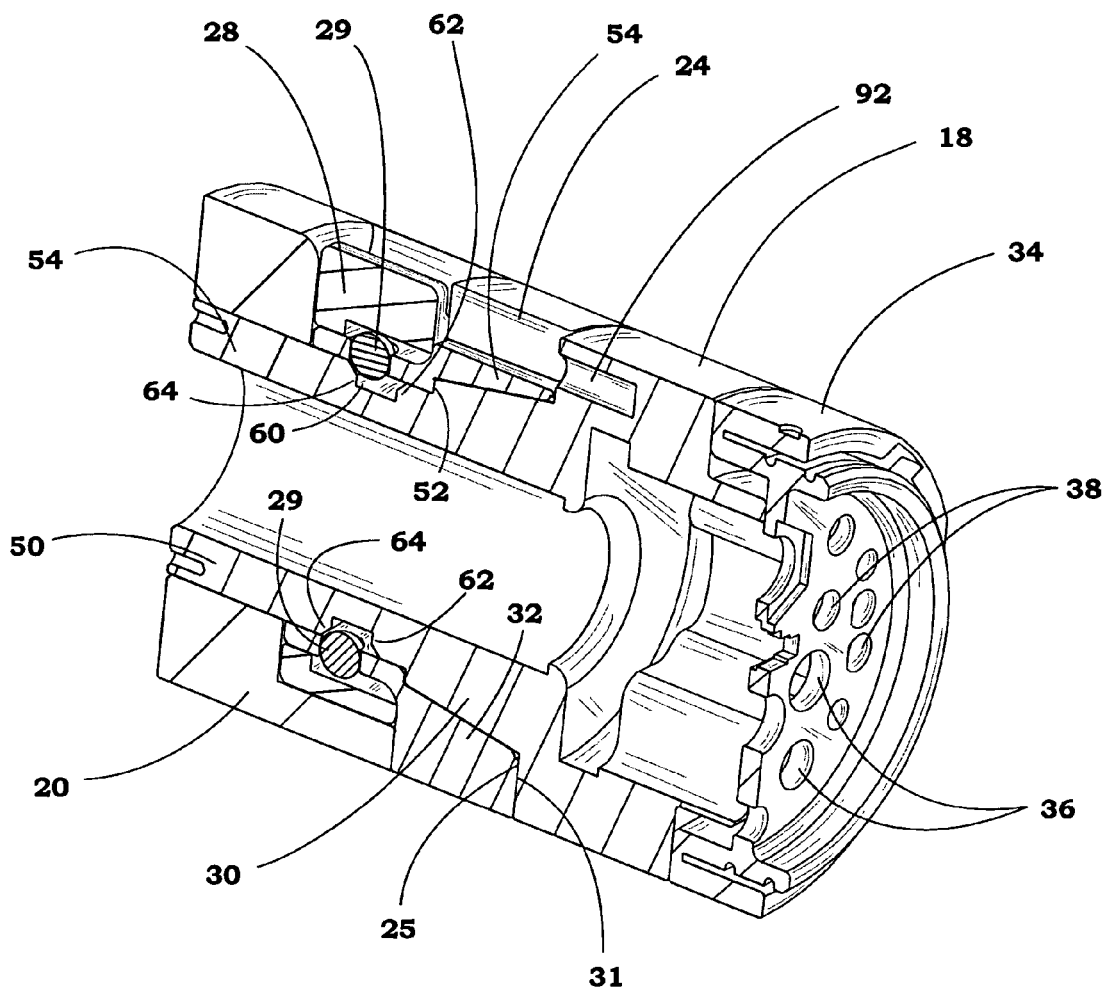
FIG. 6 is a perspective view in axial cross section of the male and female portions of the coupling assembly of FIG. 1 in a fully engaged position.

As further shown in FIGS. 1 and 7, the animal holding system 12 further includes an interconnection on panel 34 which includes ports 36 for the passage of fluids such as anesthesia gasses, and electrical connectors 38 for the connection of sensors located within animal holding chamber 39. The fluid ports 36 and electrical connectors 38 communicate with aligned bores or passages 41 (FIG. 4) formed through the male coupling portion 18. Panel 34 can be connected to the male coupling portion 18 with axially-extending plastic screws, and as seen in FIGS. 6 and 7, each of the ports 36 is formed in a panel wall extending over a central bore through the coupling portions 18, 20.

An optional electrical lead and fluid tube support tray 40 (FIGS. 1 and 7) is fixed to the outer face 42 of the male coupling portion 18, such as with plastic screws which thread into bores 44 (FIG. 4) in outer face 42. Tray 40 is removed from FIG. 4 for clarity. Wires and tubes supported on tray 40 pass through the coaxially-aligned central through bores or passages in the male and female coupling portions 18 and 20. Tray 40 receives and supports the electrical wires and fluid tubes (not shown) exiting the outer end of the male coupling portion 18. As seen in FIGS. 6 and 7, the fluid ports 36 are smaller than the through bores in the male and female coupling portions 18, 20.

Figure 4:
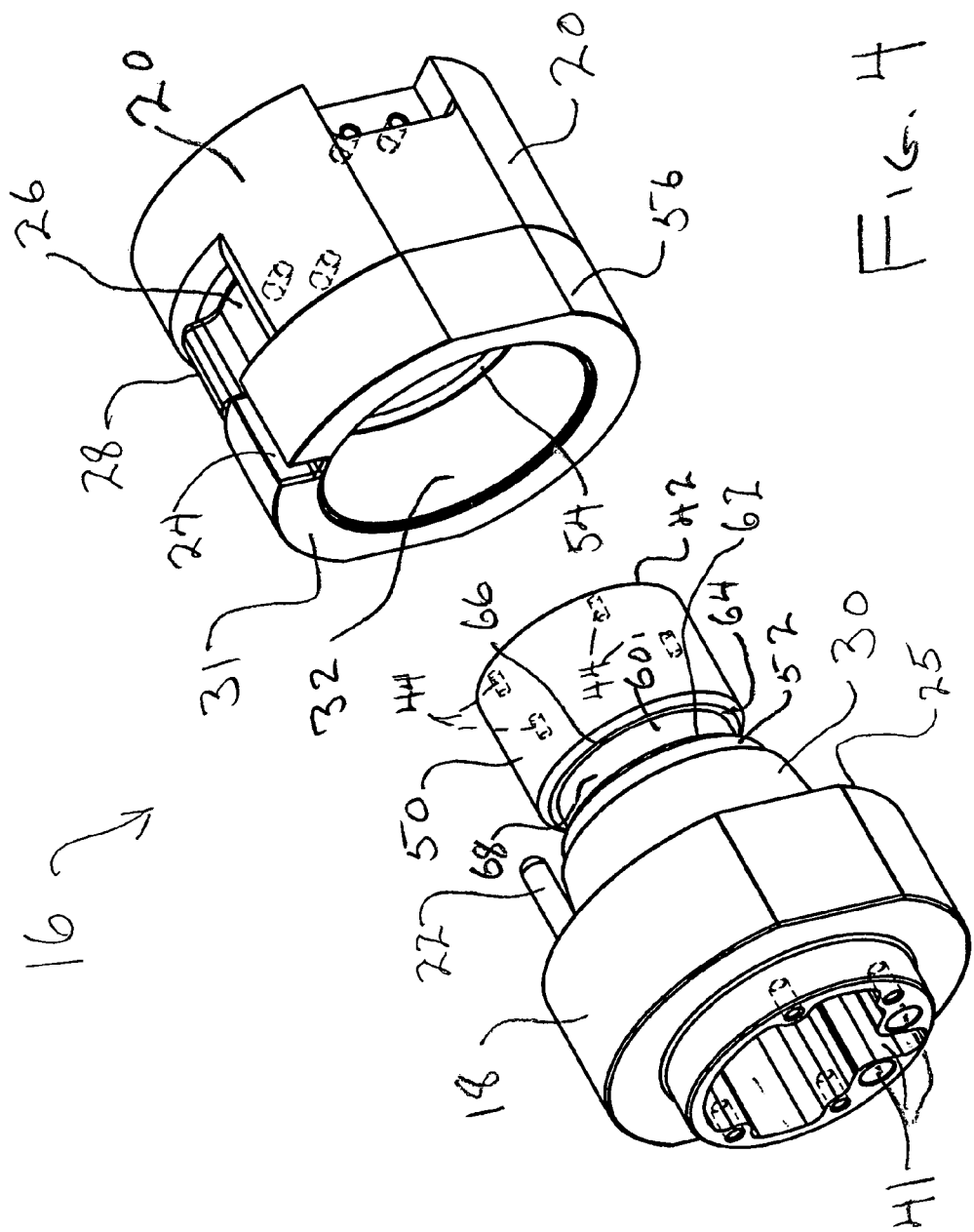
FIG. 4 is an enlarged perspective view of the coupling assembly of FIGS. 1 and 2, shown in a decoupled position and with the interconnection panel removed from the male coupling portion for clarity.

As further shown in FIG. 4, the male coupling portion 18 further includes a cylindrical locking and alignment collar 50 extending axially from the smaller diameter outer or front end of the frustoconical male plug portion 30. A cylindrical radial step 52 (FIGS. 4 and 6) on the collar 50 is formed for receiving the cylindrical ball retainer sleeve 54 (FIG. 5) extending from the rear portion of annular front socket member 56.

Radial step 52 leads forwardly or outwardly into an annular locking groove 60 formed in collar 50. Groove 60 is axially bounded by a rear wall 62 and a ramped or chamfered front wall 64. Front wall 64 includes a small radial face 66 (FIG. 4) adjacent the bottom of floor 68 of groove 60. As discussed below, groove 60 coacts with balls 29 to produce a positive snap-type locking action between the male and female coupling portions 18 and 20.

Figure 5:
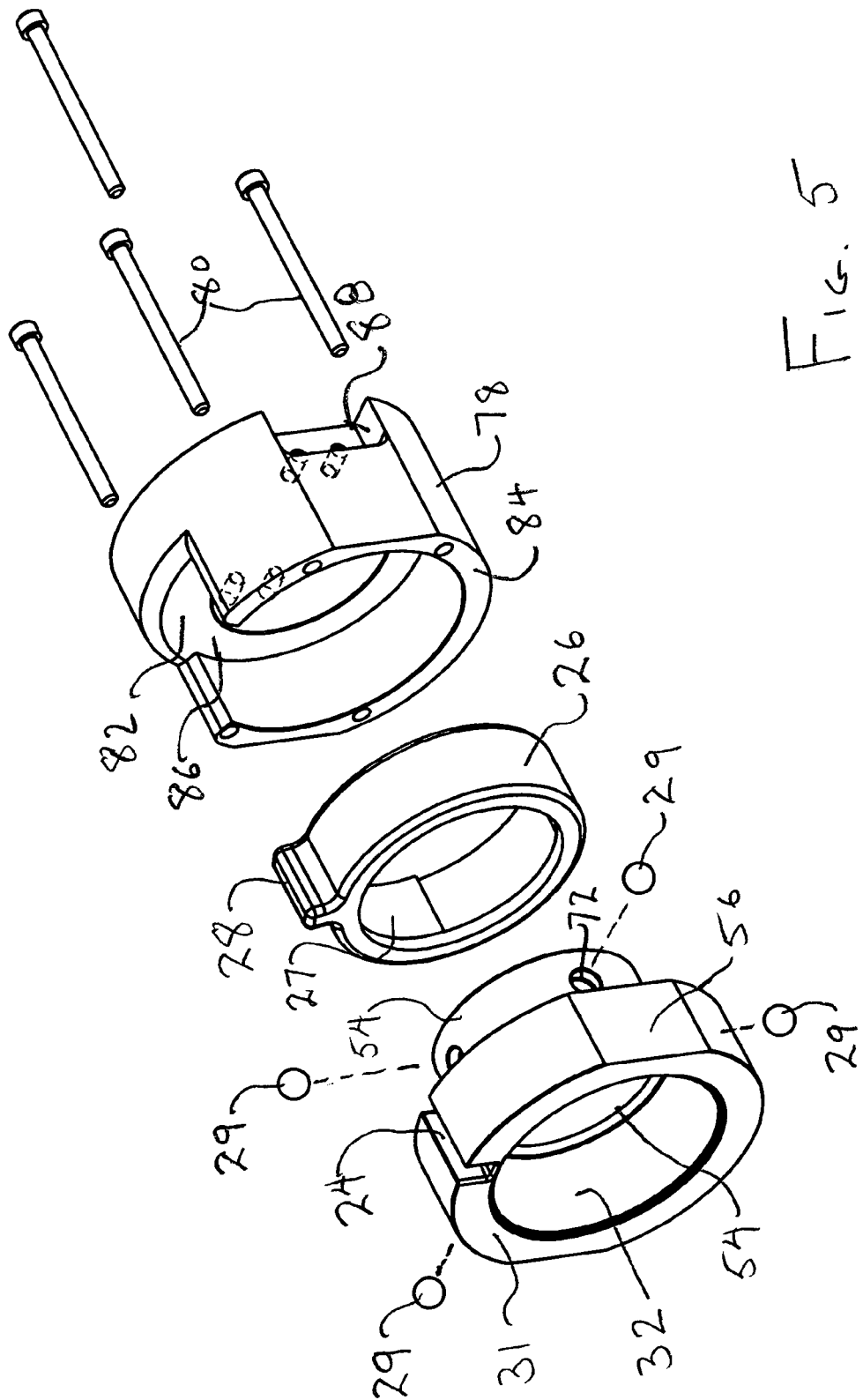
FIG. 5 is an exploded perspective view of the female coupling portion of FIG. 4.

Turning now to FIG. 5, it is seen that the balls 29 are held within stepped radial bores 72 formed in the ball retainer sleeve 54. A small step in the form of a small radial constriction at the bottom of each bore 72 prevents the balls 29 from passing completely through each bore. While four balls 29 spaced ninety degrees apart around sleeve 54 are shown in FIG. 5, any suitable number of balls may be used. Balls 29 may be formed of hard plastic, ceramic or glass. Nonferrous metals may also be used for balls 29. Advantageously, all components of the coupling 16 are formed of nonferrous plastic materials so as to be suitable for use in MRI type imaging machines.

Once the balls 29 are loosely seated in bores 72, the cam ring 26 is placed over the balls 29 and coaxially around the ball retainer sleeve 54. A cup-shaped socket member 78 (FIG. 5) is then placed over the cam ring 26 and tightly fixed to the front socket member 56 with plastic screws 80.

The rear socket member 78 includes a rear annular wall 82 and a cylindrical front wall 84. The front wall 84 has an open slot 86 for receiving and guiding the finger grip tab 28. Mounting recesses 88 are formed in the rear wall 82 for receiving brackets 90 (FIG. 1), to which the positioning receiver assembly 14 is attached.

As can be seen in FIG. 6, when the male coupling portion 18 is inserted into the female coupling portion 20, the balls 29 are aligned over groove 60. In order to lock the male and female coupling portions securely together, the cam ring 26 is rotated so as to gradually radially drive the balls 29 against the ramped or chamfered front wall 64 of the male coupling portion 18.

As the cam ring is rotated, the cam ramps 27 force the balls 29 further radially inwardly against wall 64. This creates an axial wedging force against wall 64 which axially pulls the male coupling portion 18 into the female coupling portion 20. The coupling members 18 and 20 are closely dimensioned such that when the balls 29 clear the lower or radially inner end of wall 64, the radial registration surfaces 25 and 31 are tightly axially abutted against one another. At this point, the balls 29 snap down with a quick positive action along radial face 66 (FIG. 4) of groove 60 and securely seat against the floor 68 of groove 60.

At this point, the coupling 16 is locked together, with frustoconical surfaces 30 and 32 tightly wedged together to produce an accurate coaxial alignment between the male and female coupling portions 18 and 20. In FIG. 6, alignment pin or male keying member 22 is removed for clarity, but its mounting bore 92 is shown. Each component of the coupling assembly 16 is shown in exploded view in FIG. 7. As seen in FIGS. 1 and 2, the animal holding system 12 and animal holding chamber 39 are cantilevered from the coupling 16.

There has been disclosed heretofore the best embodiment of the invention presently contemplated. Obviously, numerous modifications and variations of the present invention are possible in light of the above teachings. It is therefore to be understood that within the scope of the appended claims, the invention may be practiced otherwise than as specifically described herein.

What is claimed is:

1. A coupling assembly releasably connecting an animal specimen holder to a positioning receiver assembly to form a multicomponent specimen positioning system, said coupling assembly comprising:
   a specimen holder constructed to hold an animal in an imaging machine;
   a positioning receiver assembly constructed to mount said specimen holder in an imaging machine;
   a male coupling portion having an axially-extending frustoconical plug portion and mounted on one of said specimen holder and said positioning receiver assembly;
   a female coupling portion having an axially-extending frustoconical socket portion and mounted to the other of said specimen holder and said positioning receiver assembly;
   said axially-extending frustoconical plug and socket portions comprising precision machined surfaces machined on said male and female coupling portions;
   a male keying member projecting from a predetermined circumferential position on one of said male and female coupling portions and into a corresponding slot on the other of said male and female coupling portions for aligning and fixing said male and female coupling portions in the same circumferential positions each time said male and female coupling portions are coupled so as to accurately and repeatably position and align the animal specimen in the same circumferential position; and
   a driver comprising a cam member mounted on said female coupling portion; wherein said driver moves relative to the female coupling portion to drive said cam member for axially driving said male coupling portion and said female coupling portion into tight abutment with one another and applying an axial force and a radial force between said precision machined surfaces machined on male and female coupling portions so as to form said multicomponent specimen positioning system with said frustoconical plug and socket portions tightly wedged together to produce an accurate repeatable axial location and coaxial alignment between said male and female coupling portions.

2. The coupling assembly of claim 1 wherein said cam comprises a manually-actuated cam.

3. The coupling assembly of claim 2, wherein said cam comprises a ring having an internal ramp portion.

4. The coupling assembly of claim 1, further comprising at lease one plastic ball located between said male coupling portion and said female coupling portion.

5. The coupling assembly of claim 1, wherein said male coupling portion and said female coupling portion are formed with through-bores.

6. The coupling assembly of claim 1, wherein said male coupling portion comprises a locking collar.

7. The coupling assembly of claim 6, wherein said locking collar has a locking groove formed therein.

8. The coupling assembly of claim 1, wherein said male coupling portion and said female coupling portion each comprises an abutment and registration surface for abutting against one another in a locked condition.

9. A releasable coupling, comprising:
   a first coupling portion having a first frustoconical surface portion and a first central through bore;
   a second coupling portion having a second frustoconical surface portion and a second central through bore;
   at least one cam located between said first and second coupling portions; a driver mounted on said second coupling portion for driving said cam between said first and second coupling portions a male keying member projecting from a predetermined circumferential position on one of said first and second coupling portions and into a corresponding slot on the other of said first and second coupling portions for aligning and fixing said male and female coupling portions in the same circumferential position relative to one another each time said male and female coupling portions are coupled; wherein said driver moves relative to the second coupling portion to drive said cam so as to lock and unlock said first and second coupling portions together and to engage and disengage said first and second frustoconical surface portions; and
   an interconnection panel provided on one of said first and second coupling portions, said interconnection panel having a plurality of ports formed there through allowing for the passage of fluids, wherein each of said ports is formed in a panel wall extending over said first central through bore and wherein each of said ports is smaller than said first central through bore.

10. The coupling of claim 9, further comprising a specimen holder coupled to and cantilevered from said first coupling portion, said specimen holder comprising an animal holding chamber constructed to hold a laboratory rodent.

11. The coupling of claim 9, further comprising an electrical connector mounted on said interconnection panel.

12. The assembly of claim 9, wherein said driver comprises a rotatable ring and said cam comprises a plastic ball.

13. The coupling of claim 12, wherein said rotatable ring comprises at least one circumferentially-extending ramped cam surface portion.

14. The coupling of claim 9, wherein said first coupling portion has a groove formed therein for receiving said at least one cam and said second coupling portion comprises a sleeve for supporting said driver for movement over said sleeve.

15. The coupling of claim 9, wherein said first coupling portion has a first registration surface and said second coupling portion has a second registration surface and wherein said driver and said cam drive said first and second registration surfaces into tight abutment against one another.

16. A releasable coupling, comprising:
   a first coupling portion having a groove formed therein;
   a second coupling portion having a rotable driver coupled thereto;

at least one plastic member movable into said groove by said driver;

a chamfered wall bounding said groove for guiding said movable plastic member into said groove;

a keying arrangement comprising a male keying member projecting from a predetermined circumferential position on said first coupling portion and into a corresponding slot on said second coupling portion coupling portions, said keying arrangement providing accurate, repeatable clockwise alignment between said first and second coupling portions in the same circumferential positions each time said first and second coupling portions are coupled; wherein said driver rotates relative to the second coupling portion moving said plastic member in and out of said groove so as to lock and unlock said first and second coupling portions together;

an interconnection panel provided on one of said coupling portions and having a plurality of ports formed therethrough for the passage of fluids; and a specimen holder cantilevered in a repeatable fixed position on said coupling and constructed to hold a laboratory rodent.

17. The coupling of claim 16, further comprising an electrical connector provided on said interconnection panel.

* * * * *

UNITED STATES PATENT AND TRADEMARK OFFICE
CERTIFICATE OF CORRECTION

PATENT NO. : 7,534,067 B2  
APPLICATION NO. : 11/346851  
DATED : May 19, 2009  
INVENTOR(S) : Chris D. Chiodo Page 1 of 1

It is certified that error appears in the above-identified patent and that said Letters Patent is hereby corrected as shown below:

Column 7, lines 8 and 9, that portion of claim 16 reading "said second coupling portion coupling portions,"

Should read "said second coupling portion"

Signed and Sealed this

Twenty-first Day of July, 2009

JOHN DOLL
*Acting Director of the United States Patent and Trademark Office*